United States Patent
Kejariwal et al.

(10) Patent No.: US 8,903,736 B2
(45) Date of Patent: Dec. 2, 2014

(54) FAST NETWORKED BASED ADVERTISEMENT SELECTION

(75) Inventors: Arun Kejariwal, Sunnyvale, CA (US); Amir Behroozi, Saratoga, CA (US); Sapan Panigrahi, Castro Valley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 508 days.

(21) Appl. No.: 12/754,422

(22) Filed: Apr. 5, 2010

(65) Prior Publication Data

US 2011/0246295 A1 Oct. 6, 2011

(51) Int. Cl.
*G06Q 30/00* (2012.01)
*G06Q 30/02* (2012.01)

(52) U.S. Cl.
CPC ............ *G06Q 30/00* (2013.01); *G06Q 30/0254* (2013.01); *G06Q 30/0251* (2013.01)
USPC .................. 705/14.4; 705/14.49; 711/158

(58) Field of Classification Search
CPC .............. G06F 17/30861; G06F 17/64; G06Q 30/0256; G06Q 30/77
USPC ............................................................ 705/14
See application file for complete search history.

(56) References Cited

U.S. PATENT DOCUMENTS

| | | | |
|---|---|---|---|
| 2005/0021915 A1* | 1/2005 | Lowe et al. | 711/154 |
| 2008/0209407 A1* | 8/2008 | Okabayashi et al. | 717/146 |
| 2008/0270223 A1* | 10/2008 | Collins et al. | 705/10 |
| 2009/0106676 A1* | 4/2009 | Brezina et al. | 715/763 |
| 2010/0100438 A1* | 4/2010 | Proto et al. | 705/14.52 |
| 2010/0169175 A1* | 7/2010 | Koran | 705/14.45 |
| 2011/0099201 A1* | 4/2011 | Shen et al. | 707/771 |
| 2012/0095837 A1* | 4/2012 | Bharat et al. | 705/14.54 |

OTHER PUBLICATIONS

E. Agichtein, E. Brill and S. Dumais, "Optimizing Web Search Using Social Annotations," in Proceedings of SIGIR, Aug. 2006, 8 pages.
S. Bao, G. Xue, X. Wu, Y. Yu, B. Fei and Z. Su, "Improving Web Search Ranking by Incorporating User Behavior," In Proceedings of the 16th International conference on World Wide Web, pp. 501-510, Banff, Alberta, Canada, May 2007.
A. Brin and L. Page, "The Anatomy of a Large-Scale Hypertextual Web Search Engine," Computer Networks and ISDN Systems, 30(1):107-117, 1998.

(Continued)

*Primary Examiner* — John G Weiss
*Assistant Examiner* — Christopher Stroud
(74) *Attorney, Agent, or Firm* — Brinks Gilson & Lione (57) ABSTRACT

A system for serving advertisements determines the frequency of occurrence for each parameter of a plurality of parameters associated with a plurality of search queries. The plurality of parameters are associated with one or more advertisements. The system stores at least some parameters to a first storage based on the frequency of occurrence of the parameters. The system stores the other parameters to a second storage that has a higher latency than the first storage. When serving advertisements, the system ranks advertisements for delivery based on the parameters stored in the first storage device and the second storage.

20 Claims, 7 Drawing Sheets

(56) References Cited

OTHER PUBLICATIONS

J. I. Cole, M. Suman, P. Schramm, R. Lunn and J. S. Aquino, "The UCLA Internet Report Surveying the Digital Future Year Three," UCLA Center for Communication Policy, Feb. 2003, 89 pages.
GCC, the GNU Compiler Collection: http://gcc.gnu.org/, 2 pages.
F. McSherry, "A Uniform Approach to Accelerated PageRank Computation," In Proceedings of the 14th International Conference on World Wide Web, pp. 575-582, Chiba, Japan, May 2005.
M. Richardson, A. Prakash and E. Brill, "Beyond PageRank: Machine Learning for Static Ranking," In Proceedings of the 15th International Conference on World Wide Web, pp. 707-715, Edinburgh, Scotland, May 2006.

* cited by examiner

Fig. 1

| Field 1 (Language) | |
|---|---|
| Ad 1 | English |
| Ad 2 | Spanish |
| Ad 3 | English |
| . . . | |
| Ad N | French |

200

| Field 2 (Country) | |
|---|---|
| Ad 1 | US |
| Ad 2 | Spain |
| Ad 3 | Any |
| . . . | |
| Ad N | France |

205

| Field 3 (State/City) | |
|---|---|
| Ad 1 | California |
| Ad 2 | Barcelona |
| Ad 3 | Any |
| . . . | |
| Ad N | Paris |

210

| Field 4 (Activity) | |
|---|---|
| Ad 1 | Sports |
| Ad 2 | Sports |
| Ad 3 | Music |
| . . . | |
| Ad N | Any |

215

| Field 5 (Age) | |
|---|---|
| Ad 1 | 20-30 |
| Ad 2 | Any |
| Ad 3 | 10-20 |
| . . . | |
| Ad N | Any |

220

| Field N (Time) | |
|---|---|
| Ad 1 | All day |
| Ad 2 | All day |
| Ad 3 | Evening |
| . . . | |
| Ad N | Any |

FAST NETWORKED BASED ADVERTISEMENT SELECTION

BACKGROUND

The Internet has emerged as a powerful advertising tool. It is commonplace to see advertisements on many web sites. For example, advertisements may be displayed on search web sites and may be targeted to individuals based upon search terms provided by the individuals. Other web sites, such as news and sports web sites, may provide space for advertisements. The owners of these web sites may sell advertising space to advertisers to offset the costs associated with operating the web sites as well as to turn a profit.

Before serving an advertisement to a host web site or in response to a search query, a large number of advertisements are ranked to determine which advertisements are the most suitable. Ranking typically involves analyzing parameters associated with each of the advertisements to find the best fit. Owing to the large number of advertisements, the parameters of the advertisements are typically stored in a mass storage device, such as an array of hard drives, which can exhibit high latency when reading and writing data. The high latency ultimately results in an increase in the amount of time needed to serve an advertisement.

DETAILED DESCRIPTION

The embodiments below describe an exemplary embodiment of a system for serving advertisements. Generally, the system ranks advertisements based on the relatedness of the advertisements to a search query specified by a searcher. The system determines the relatedness of the advertisements by comparing features that define the advertisements to fields that are associated with the search query. Each field is associated with a different feature of the respective advertisements. The fields are stored in separate field files that associate field values with the advertisements. The field files are accessed during ranking to determine the relatedness of a given advertisement. The field files that are accessed more frequently during the ranking process are stored in a low-latency storage, such as a solid state memory or similar device. Other fields are stored in a high-latency storage, such as an array of hard drives that exhibits a higher latency than the low-latency storage when accessing files.

Figure 1:
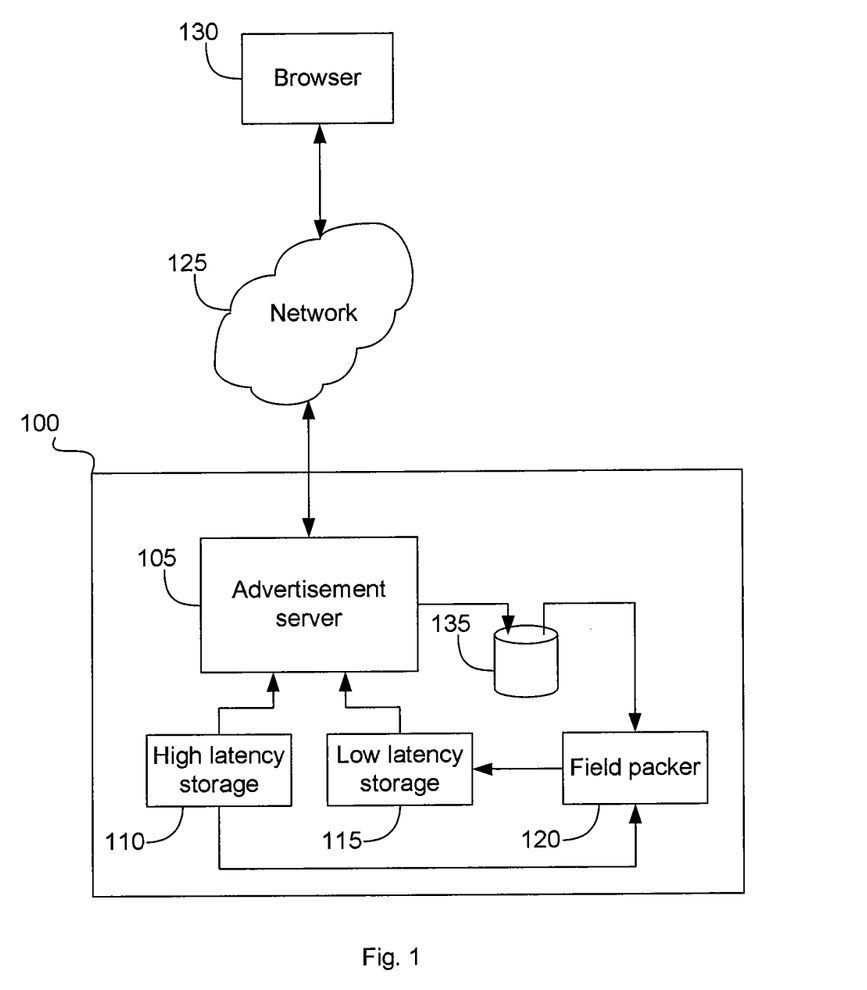
FIG. 1 is an exemplary system for serving advertisements.

FIG. 1 is an exemplary system 100 for serving advertisements. The system 100 includes an advertisement server 105, a field packer 120, a high-latency storage device 110, a low-latency storage device 115, and a query database 105. The various components of the system 100 may reside on a single computer system or be distributed among several computers interconnected by a communication network.

The advertisement server 105 and the field packer 120 may correspond to an Intel®, AMD®, or PowerPC® based computer or a different computer. The advertisement server 105 and the field packer 120 may include an operating system, such as a Microsoft Windows®, Linux, or other Unix® based operating system. The advertisement server 105 and the field packer 120 may be configured to communicate with other computers via an interface, such as a network interface.

The high-latency storage 110 may correspond to a mass storage device, such as one or more computer hard drives, which have a relatively slow access time when compared to the low-latency storage 115. The low-latency storage 115 may correspond to a fast memory storage device, such as a DRAM or similar technology.

The advertisement server 105 may include code, logic, and/or other circuitry that enables the reception of a request to serve a search web page, such as a Yahoo!® search page, to a browser 130, and to communicate a web page with search results to the browser 130. The search results include links to web pages and advertisements that are associated with a search term or search query.

In selecting an advertisement to be served, the advertisement server 105 may rank several advertisements and provide each advertisement with a score indicative of the advertisement's relatedness to the search query. The higher the score, the more suitable the advertisement may be. The magnitude of the score is directly proportional to the number of advertisement features related to the search query. Features generally correspond to targeting attributes associated with a given advertisement. The targeting attributes may be specified by an advertiser. The features of an advertisement may define demographic information that defines a target audience, such as the age and gender of the target audience. Features may indicate, for example, that the advertisement is associated with music, or a different hobby. In the case of music, the features may indicate that the advertisement is associated with a genre. A given advertisement may have many other features that define the advertisement.

The number of features associated with a given advertisement may vary depending on the specificity of the targeting attributes. Some advertisements may define 600 features or more. Fields may be utilized to indicate whether the advertisement includes a given feature. The fields may also define the feature. For example, a music field of a first advertisement may be set to true where the advertisement is associated with music. The music field of a second advertisement unrelated to music may be set to zero or null indicating that the second advertisement is not related to music at all. In a similar manner, the fields associated with other features of an advertisement may be utilized to indicate whether the advertisement possesses a particular feature.

To facilitate quick identification of advertisements that possess a given feature, multiple data files may be utilized to store field values associated with advertisements. Each file or field file may include data that indicates whether a given advertisement possesses a feature defined by the field.

Figure 2:
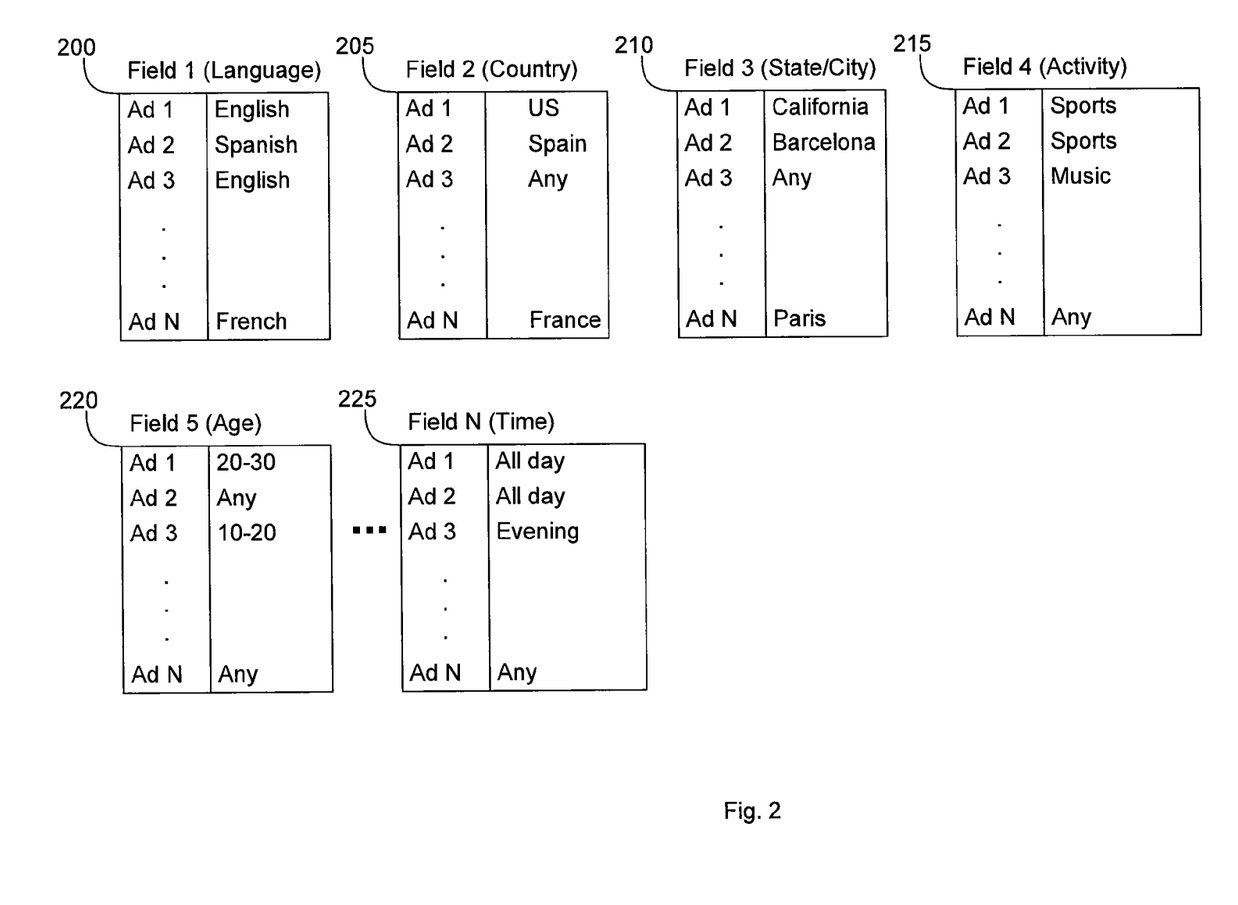
FIG. 2 illustrates an exemplary group of field files that store values that define the features of one or more advertisements.

FIG. 2 illustrates an exemplary group of field files 200-225 that store values that define the features of a group of advertisements. As shown, a first field file 200 may store the language information associated with the advertisements. A second field file 205 may store country information associated with the advertisements. A third field file 210 may store state and city information associated with the advertisements. A fourth field file 215 may store activity information associated with the advertisements. A fifth field file 220 may store age information associated with the advertisements. As noted above, in some implementations, 600 features or more may be utilized to specify a given advertisement. In this case, 600 field files may be utilized to store field values that define the 600 features that define the advertisements. The storage requirements needed for storing all the field files can be very high given the number of possible features and the number of available advertisements.

Returning to FIG. 1, most of the field files referred to above may be stored in the high-latency storage 110. However, field files that are accessed more frequently during the ranking process (described below) may be stored in the low-latency storage 115. This arrangement results in a decrease in the amount of time necessary to rank a given advertisement, because the advertisement server 105 is configured to search for field files in the low-latency storage 115 first, which can be accessed relatively quickly. If the field file is not found in the low-latency storage 115, then the advertisement server 105 is configured to search for the field file in the high-latency storage 110. The most frequently utilized field files are stored in the low-latency storage 115.

The field packer 120 may include code, logic, and/or other circuitry that enables moving the most frequently accessed field files to the low-latency storage device 115. The field packer 120 may determine the most frequently accessed field files by analyzing search query history data stored in a query database 135. The queries in the query database 135 may correspond to all the search queries received during a given period, such as 1 day or 1 hour.

Exemplary operations of the system 100 are described below with references to FIGS. 3-6.

Figure 3:
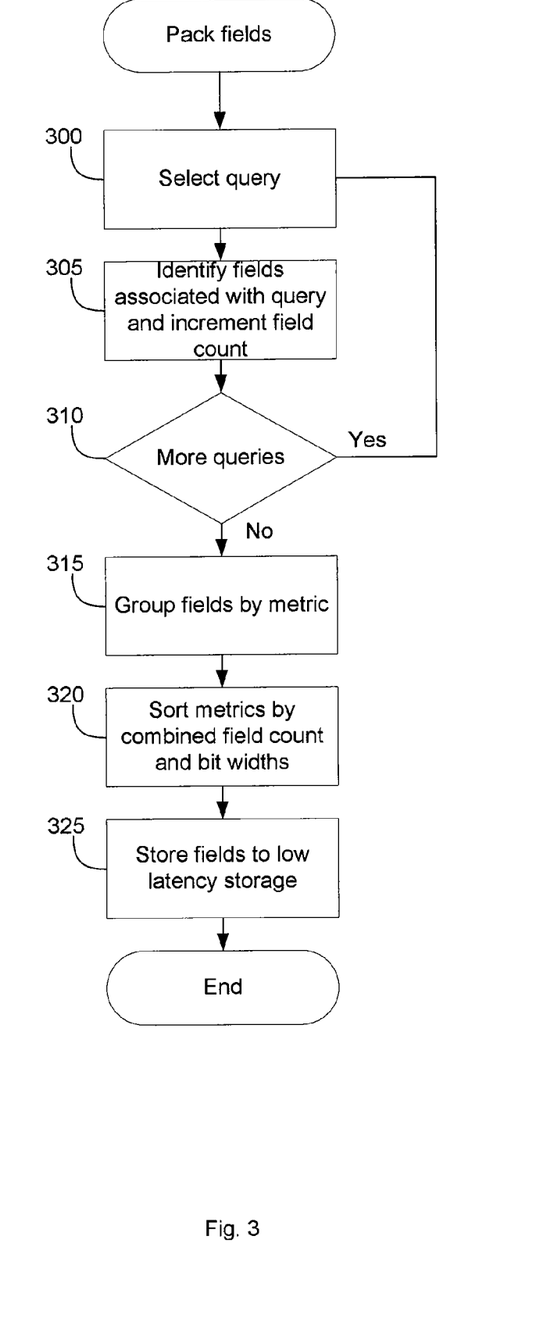
FIG. 3 illustrates an exemplary group of operations that may be performed by a field packer of the system.

FIG. 3 illustrates an exemplary group of operations that may be performed by the field packer 120. The operations of FIG. 3 are better understood with reference to the illustrations of FIG. 4. At block 300, the field packer 120 (FIG. 1) may select a query 400 (FIG. 4) from the query database 135 (FIG. 1). For example, the selected query 400 may be the term "Madonna." In some embodiments, the field packer 120 may generate a group of query rewrites, which correspond to other queries that have been previously determined to be associated with the selected query by, for example, analyzing the search habits of searchers.

At block 305, the field packer 120 may determine fields 410 (FIG. 4) associated with the selected query 400 or the query rewrites and may count the occurrences of a given field. For example, the query rewrite "music" may be associated with an activity field and a music genre field. These fields are associated with field files that are searched when a user specifies the query "music" or when the rewrite "music" is generated as the result of a user query. Similarly, the query or rewrite "pop music" may be associated with the field files "activity," "music genre," "gender type," and "age range," meaning that field files associated with these fields are searched when determining whether a given advertisement is associated with the rewrite "pop music."

At block 310, if there are additional queries or query rewrites in the query database 135, then the operations from block 300 may be repeated. The count for a given field is increased every time the field is determined to be associated with a query in the query database 135. After all the queries and query rewrites are evaluated, a total count for each field may be determined. The total count associated with each field is indicative of how often, or the frequency with which a given field file is analyzed over the period represented by the queries in the query database 135. For example, if the queries in the query database 135 represent a day's worth of search queries, the field count associated with each field represents the number of times in a day that a given field file is accessed and searched. Stated differently, the field count corresponds to a field frequency indicating how frequently a given field file is accessed.

Figure 4:
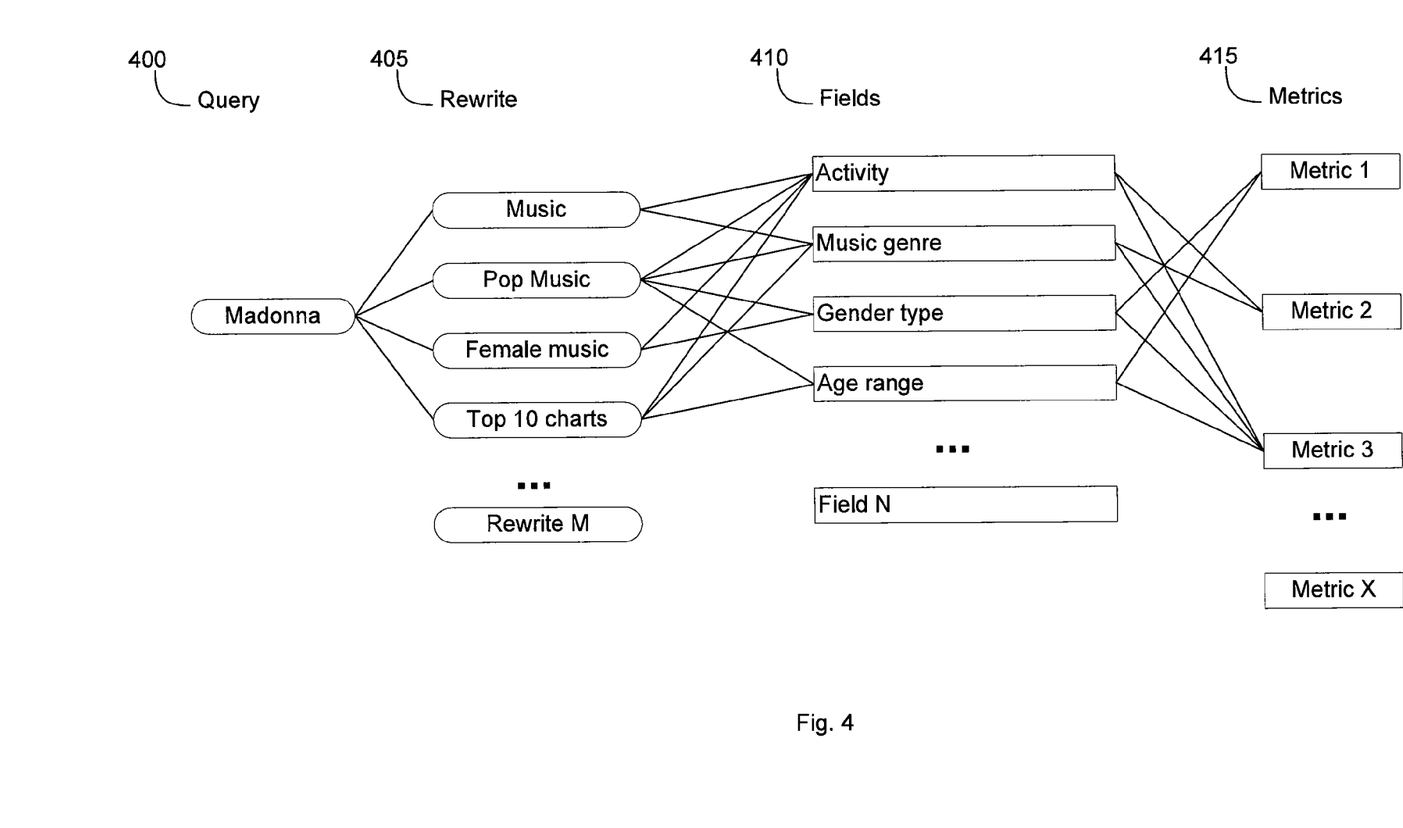
FIG. 4 illustrates the relationship between queries, fields, and metrics.

At block 315, the field packer 120 generates a group of metrics 415 (FIG. 4). A metric 415 is a grouping of one or more fields. Metrics 415 are utilized to group the fields into classes that may be utilized to derive semantic information associated with the fields. For example, a first metric may represent a gender-type field and an age-range field and may enable determining semantic information such as the number of females within a certain age group that are submitting search queries. A second metric may represent an activity field and a music-genre field and may enable determining semantic information such as the type of music most searchers are looking for.

The frequency associated with a given metric is directly proportional to the sum of the frequencies of the individual fields that are classified or grouped by the metric. Weighting factors may be applied to the field frequency of the individual fields to increase or decrease the effect a given field frequency has on a given metric.

At block 320, the field packer 120 may sort the metrics according to the frequency of the metric. For example, the weighted sum of all the frequencies of the fields represented by a first metric may be greater than the weighted sum of all the frequencies of the fields represented by a second metric.

In some implementations, the bit width associated with a given metric may be determined and taken into consideration when sorting the metrics. The bit width of a metric is equal to the combined bit width of the fields the metric represents. The bit width of a given field depends on the data the field represents. For example, a field that stores a Boolean value associated with one or more advertisements, such as yes or no, true or false, male or female, etc., may be 1 bit wide. A field that stores a time of day value and date associated with one or more advertisements may be 32 bits wide. The bit width of a field that stores activities associated with one or more advertisements may be sized to represented enumerated values that represent the activities. For example, 16 activities may be represented by 4 bits.

The advantage to considering bit widths becomes clear when one considers that the frequency of two or more metrics may be similar. However, it may be the case that the bit width of one of the metrics is significantly smaller than the bit widths of the other metrics. The metrics with the smallest bit width would, therefore, be more likely to fit within a low-latency storage 115 (FIG. 1), such as a DRAM.

At block 325, the field packer 120 stores the field files associated with fields represented by the metrics with the highest frequency or the highest normalized frequency to the low-latency storage 115 to the extent that the field files will fit in the low-latency storage 115. The operations described above may run on a periodic basis, such as once a day or once a week, or a different period, to enable tracking changes in the search habits of searchers.

Figure 5:
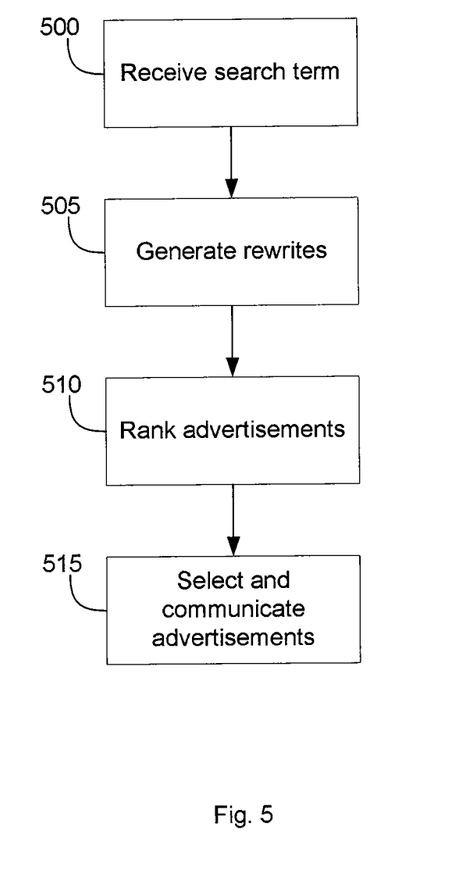
FIG. 5 illustrates exemplary operations of an advertisement server of the system that are performed when receiving a search query request or when determining an advertisement to serve.

FIG. 5 illustrates exemplary operations of the advertisement server 105 that are performed when receiving a search query request or when determining an advertisement to serve to a web page with sponsored advertisements. At block 500, the advertisement server 105 may receive a search query. For example, a user may specify a search query via a search web site, such as Yahoo! search.

At block 505, the advertisement server 105 may generate rewrites of the search query. The rewrites are utilized to increase the size of the result list communicated to the searcher and to identify an increased number of advertisements that may be related to the original search query.

At block 510, advertisements may be ranked according to their relatedness to the search query and/or the query rewrites, as described in more detail below. To determine the relatedness, the queries and/or query rewrites are associated with a group of field files and respective field values to be searched. For example, the query "Madonna" may require searching an activity field file, a genre field file, a gender field file, and an age field file for advertisements targeting the activity value "music," the music genre value "pop," the gender value "female," and the age value "20-40." The determination of the field files and respective field values may have been previously determined by, for example, observing advertisement click behaviors associated with searchers submitting search queries. The fields and field values may also be determined based solely on the query. For example, the language associated with a query may be inferred from the language in which the query is written. Other known methods may be utilized to associate queries with fields and field values.

At block 515, the advertisement server 105 may communicate the advertisements that ranked the highest or most related to the searcher. In some implementations, the advertisements are further sorted based on other factors, such as a bid price, associated with the most related advertisements.

Figure 6:
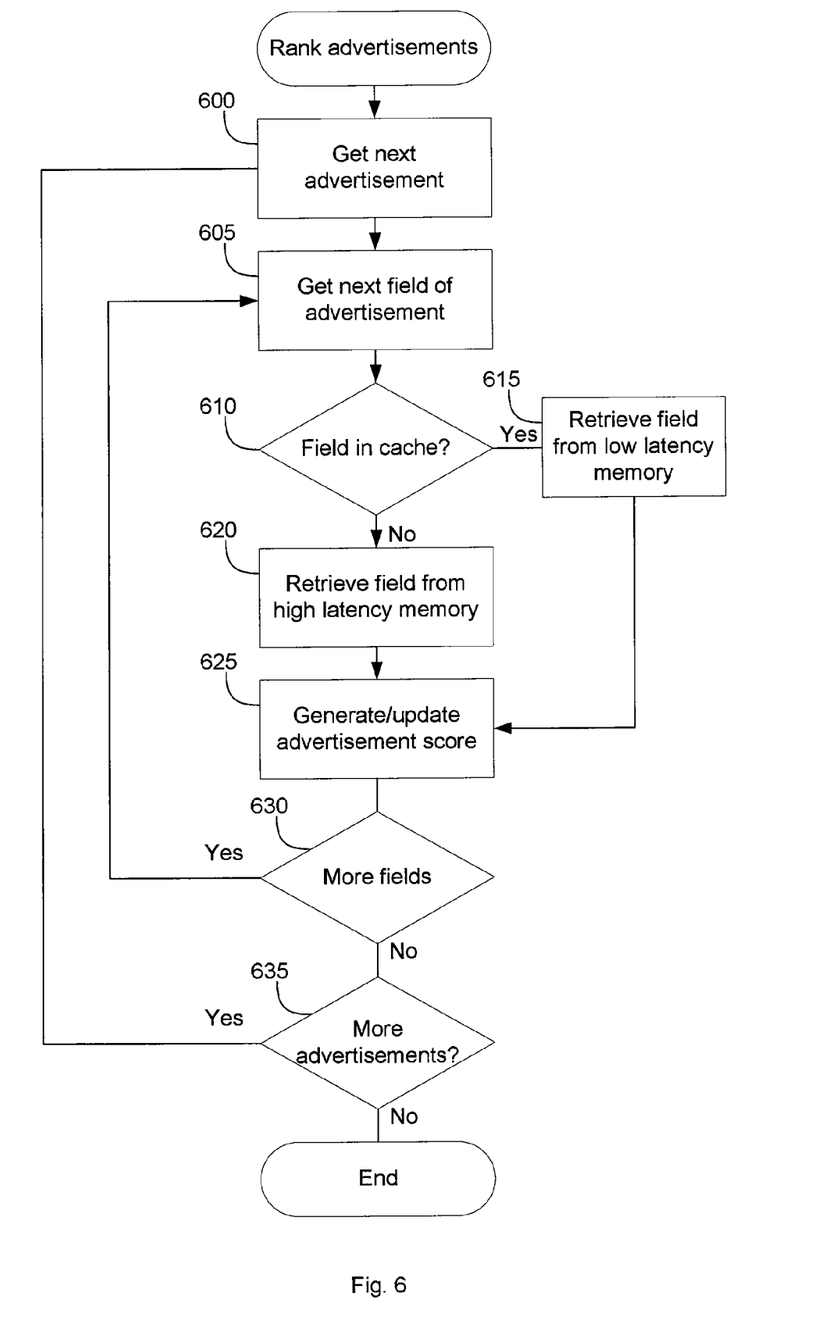
FIG. 6 illustrates a group of exemplary operations that may be performed by the advertisement server when ranking advertisements.

FIG. 6 illustrates a group of exemplary operations that may be performed by the advertisement server 105 when ranking advertisements in block 510 above. At block 600, the advertisement server 105 may select a first advertisement of a number of advertisements. For example, the advertisement server 105 may select the advertisement from a database (not shown) that includes data that defines the advertisements. The advertisement server 105 may then determine the features associated with the selected advertisement.

At block 605, the advertisement server may select a feature of the selected advertisement and determine the field file associated with the selected feature.

At block 610, the advertisement server 105 determines whether the field file is stored in low-latency storage 115. If this is the case, then at block 615, the advertisement server 105 reads the field file information from the field file stored in the low-latency storage 115, which may correspond to one or more DRAMs or similar memory devices. If at block 610, the advertisement server 105 determines that the field file is not stored in the low-latency storage 115, then the advertisement server 105 retrieves the field file from the high-latency storage 110, which may correspond to one or more hard drives or other type of mass storage device.

At block 625, the advertisement server 105 generates a score that represents the relatedness of the selected feature of the selected advertisement to the search query. The score may correspond to a Boolean value, such as 1 or 0, where 1 indicates that the selected feature is related to the search query and 0 indicates that the selected feature is not related to the search query. Alternatively, a more analog value may be utilized to quantify how related the selected feature is to the query. For example, the score may be anywhere between the values 1 and 10, where 10 indicates a high degree of relatedness and 1 indicates a low degree of relatedness.

The advertisement server 105 may determine the score by searching the field file associated with the feature for the field value associated with the selected advertisement. For example, the advertisement server 105 may search a language field file 200 (FIG. 2) to determine the language associated with the selected advertisement and may then compare the determined language with a language determined to be associated with the search query, as described above in block 510.

At block 630, if there are more features associated with the selected advertisement, then the operations may repeat from block 605. The operations between block 605 and 630 continue until each feature of the selected advertisement has been compared with the field values associated with the search query. Every time a new feature is evaluated, the score is updated at block 625. The more features an advertisement possesses that are related to the search query, the higher the score.

At block 635, if there are more advertisements, the operations repeat from block 600. After all the advertisements are analyzed, the advertisements are ranked according to their respective scores. One or more of the advertisements with the highest scores may be communicated to the searcher, as described above in block 515.

Figure 7:
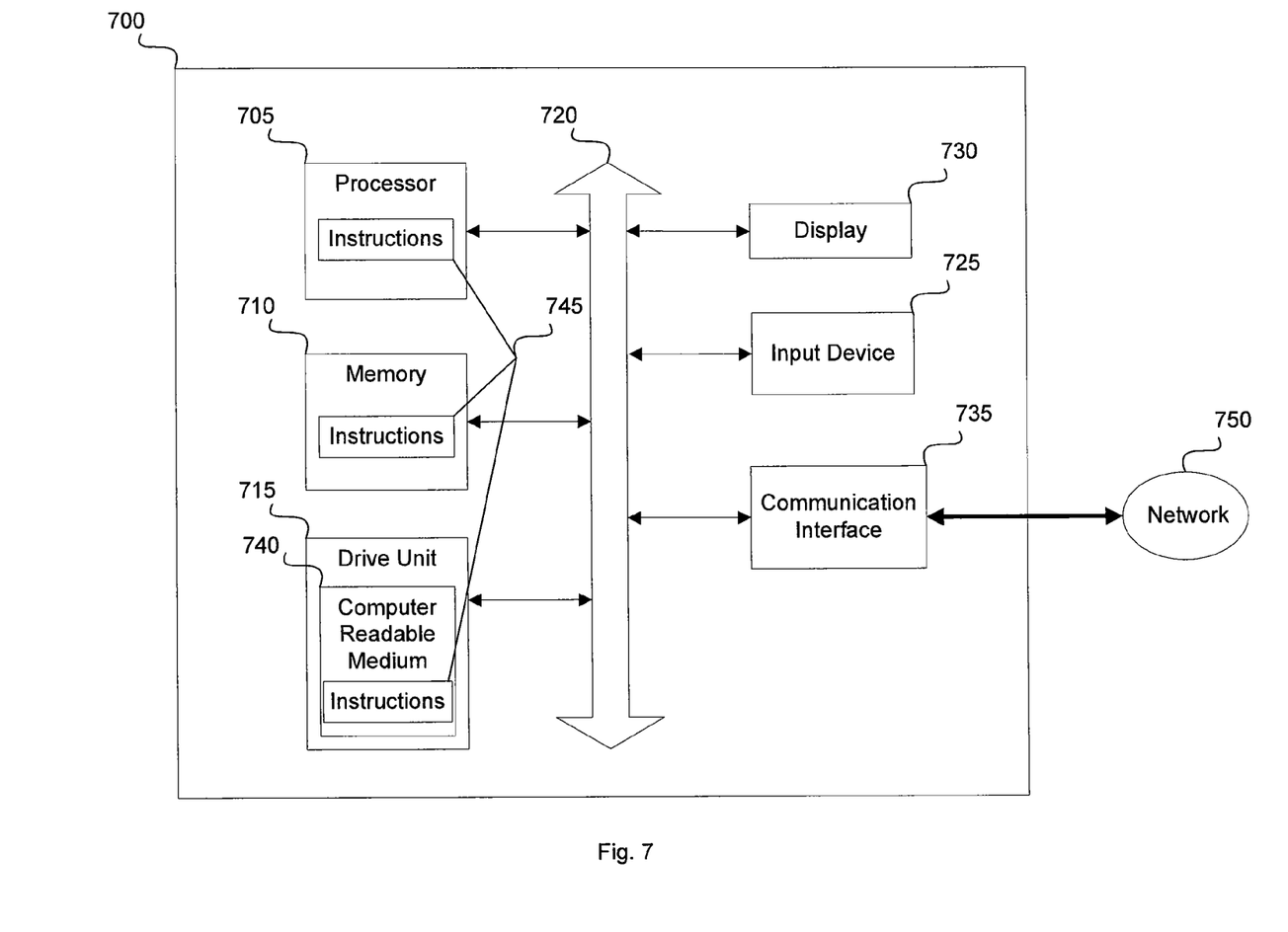
FIG. 7 illustrates a general computer system, which may represent any of the computing devices referenced herein.

FIG. 7 illustrates a general computer system 700, which may represent the advertisement server 105, the field packer 120, the browser 130, or any other computing devices referenced herein. The computer system 700 may include a set of instructions 745 that may be executed to cause the computer system 700 to perform any one or more of the methods or computer-based functions disclosed herein. The computer system 700 may operate as a stand-alone device or may be connected, e.g., using a network, to other computer systems or peripheral devices.

In a networked deployment, the computer system 700 may operate in the capacity of a server or as a client-user computer in a server-client user network environment, or as a peer computer system in a peer-to-peer (or distributed) network environment. The computer system 700 may also be implemented as or incorporated into various devices, such as a personal computer or a mobile device, capable of executing a set of instructions 745 (sequential or otherwise) that specify actions to be taken by that machine. Further, each of the systems described may include any collection of sub-systems that individually or jointly execute a set, or multiple sets, of instructions to perform one or more computer functions.

The computer system 700 may include one or more memory devices 710 on a bus for communicating information, such as the low-latency storage 115 (FIG. 1). In addition, code operable to cause the computer system to perform any of the acts or operations described herein may be stored in the memory 710. The memory 710 may be a random-access memory, read-only memory, programmable memory, hard disk drive or any other type of memory or storage device.

The computer system 700 may include a display 730, such as a liquid crystal display (LCD), a cathode ray tube (CRT), or any other display suitable for conveying information. The display 730 may act as an interface for the user to see the functioning of the processor 705, or specifically as an interface with the software stored in the memory 710 or in the drive unit 715.

Additionally, the computer system 700 may include an input device 725, such as a keyboard or mouse, configured to allow a user to interact with any of the components of system 700.

The computer system 700 may also include a disk or optical drive unit 715, such as the high-latency storage 110 (FIG. 1). The disk drive unit 715 may include a computer-readable medium 740 in which one or more sets of instructions 745, e.g. software, can be embedded. Further, the instructions 745 may perform one or more of the operations as described herein. The instructions 745 may reside completely, or at least partially, within the memory 710 and/or within the processor 705 during execution by the computer system 700. The memory 710 and the processor 705 also may include computer-readable media as discussed above.

The computer system 700 may include a communication interface 735 that enables communications via a network 750. The network 750 may include wired networks, wireless networks, or combinations thereof. The communication interface 735 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

As shown above, the system for serving advertisements enables ranking advertisements more quickly than conventional advertisement-serving systems by storing field files associated with the most common features of advertisements to a low-latency storage that is faster than a high-latency storage where less frequently accessed field files are stored. The system determines the most frequently accessed field files by analyzing search queries stored in a search query database. The system analyzes the search queries to identify fields associated with the search queries. The system then determines a frequency associated with each field and groups the fields into different metrics. The metrics are then sorted based on the frequency of the metric. Fields of the metrics with the highest frequency are then stored to the low-latency storage. In some implementations, the bit width of the respective metrics is taken into consideration when determining which fields to store to the low-latency storage.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

We claim:

1. A system stored in a non-transitory medium executable by a processor, comprising:
a field packer configured to:
select a query from a query database;
generate a group of query rewrites that correspond to other queries that have been previously determined to be associated with the selected query, each query rewrite in the group of query rewrites sharing a parameter associated with a characteristic associated with an ad;
determine a group of fields associated with the group of query rewrites; and
determine a respective amount of query rewrites in the group of query rewrites that are associated with each field of the group of fields;
a first storage device communicatively coupled to the field packer, the first storage device configured to store a data file associated with the group of fields, where the respective amounts exceed a threshold value; and
a second storage device communicatively coupled to the field packer, the first storage device having less retrieval latency than the second storage device, and the second storage device configured to store the data file, where the respective amounts do not exceed the threshold value.

2. The system of claim 1, wherein the query is a first query, the group of query rewrites is a first group of query rewrites, and the group of fields is a first group of fields, and wherein the field packer is further configured to:
select a second query from the query database;
generate a second group of query rewrites that correspond to other queries that have been previously determined to be associated with the selected second query;
determine a second group of fields associated with the second group of query rewrites; and
determine a respective amount of query rewrites in the second group of query rewrites that are associated with each field of the second group of fields.

3. The system of claim 1, wherein the query database includes a plurality of queries stored in the query database, and wherein the field packer is further configured to:
repeat the selection, the generation, and the two determinations, for the plurality of queries; and
determine a respective total amount of query rewrites that are associated with each field of a total group of fields, the fields of the total group of fields each being associated with at least one query of the plurality of queries.

4. The system of claim 1, wherein the query database includes a plurality of queries stored in the query database, and wherein the field packer is further configured to:
repeat the selection, the generation, and the two determinations, for a set of queries in the plurality of queries; and
determine a respective total amount of query rewrites that are associated with each field of a total group of fields, the fields of the total group of fields each being associated with at least one query of the set of queries.

5. The system of claim 4, wherein the set of queries is a selected set of queries for a given time period, and wherein the field packer is further configured to determine a respective frequency of query rewrites associated with each field of the total group of fields according to the respective total amount of query rewrites and the given time period.

6. The system of claim 5, wherein the system further comprises a metrics calculator communicatively coupled to the field packer and the metrics calculator is configured to determine metrics associated with the set of queries according to the respective frequencies.

7. A method, comprising:
selecting, by field packer hardware, a query from a query database;
generating a group of query rewrites that correspond to other queries that have been previously determined to be associated with the selected query, each query rewrite in the group of query rewrites sharing a parameter associated with a characteristic associated with an ad;

determining a group of fields associated with the group of query rewrites;

determining a respective amount of query rewrites in the group of query rewrites that are associated with each field of the group of fields;

storing, in a first non-transitory storage device, a data file associated with the group of fields, where the respective amounts of query rewrites exceeds a threshold value; and storing, in a second non-transitory storage device, the data file, where the respective amounts do not exceed the threshold value, the first storage device having less retrieval latency than the second storage device.

8. The method of claim 7, wherein the query is a first query, the group of query rewrites is a first group of query rewrites, and the group of fields is a first group of fields, and wherein the method further comprises:

selecting, by the field packer hardware, a second query from the query database;

generating a second group of query rewrites that correspond to other queries that have been previously determined to be associated with the selected second query;

determining a second group of fields associated with the second group of query rewrites; and determining a respective amount of query rewrites in the second group of query rewrites that are associated with each field of the second group of fields.

9. The method of claim 7, wherein the query database includes a plurality of queries stored in the query database, and wherein the method further comprises:

repeating the selection, the generation, and the two determinations, for the plurality of queries; and determining a respective total amount of query rewrites that are associated with each field of a total group of fields, the fields of the total group of fields each being associated with at least one query of the plurality of queries.

10. The method of claim 7, wherein the query database includes a plurality of queries stored in the query database, and wherein the method further comprises:

repeating the selection, the generation, and the two determinations, for a set of queries in the plurality of queries; and determining a respective total amount of query rewrites that are associated with each field of a total group of fields, the fields of the total group of fields each being associated with at least one query of the set of queries.

11. The method of claim 10, wherein the set of queries is a selected set of queries for a given time period, and wherein the method further comprises determining a respective frequency of query rewrites associated with each field of the total group of fields according to the respective total amount of query rewrites and the given time period.

12. The method of claim 11, further comprising determining metrics associated with the set of queries according to the respective frequencies.

13. A system stored in a non-transitory medium executable by a processor, comprising:

a field packer configured to:

select a set of queries from a plurality of queries, for a given time period;

for each query in the set of queries, generate a group of query rewrites that correspond to other queries in the set of queries that have been previously determined to be associated with that given query, each query rewrite in the group of query rewrites sharing a parameter associated with a characteristic associated with an ad;

for each query in the set of queries, determine a group of fields associated with the group of query rewrites;

for each query in the set of queries, determine a respective amount of query rewrites in the group of query rewrites that are associated with each field of the group of fields; and for each query in the set of queries, determine a respective frequency of query rewrites associated with each field of the group of fields, according to the respective amount of query rewrites and the given time period; and a first non-transitory storage device communicatively coupled to the field packer, the first storage device configured to, for each query in the set of queries, store a data file associated with the group of fields, where the respective frequencies of query rewrites exceed a threshold value; and a second non-transitory storage device communicatively coupled to the field packer, the first storage device having less retrieval latency than the second storage device, and the second storage device configured to, for each query in the set of queries, store the data file where the respective frequencies of query rewrites do not exceed the threshold value.

14. The system of claim 13, wherein the field packer is further configured to determine a plurality of metrics according to the respective frequencies, and wherein each metric of the plurality of metrics is a grouping of one or more fields.

15. The system of claim 14, wherein the field packer is further configured to:

select a set of fields; and determine a metric of the plurality of metrics based on the respective frequencies associated with each field of the selected set of fields.

16. The system of claim 15, wherein the field packer is further configured to derive semantic information associated with fields according to the selected set of fields.

17. The system of claim 15, wherein the field packer is further configured to:

apply a weight to at least one of the respective frequencies of the fields of the set of fields; and determine the metric of the plurality of metrics based on the at least one weight and the respective frequencies.

18. The system of claim 15, wherein the field packer is further configured to determine a frequency of the metric of the plurality of metrics according to a sum of the respective frequencies associated with each field of the selected set of fields.

19. The system of claim 17, wherein the field packer is further configured to determine a frequency of the metric of the plurality of metrics according to a weighted sum of the respective frequencies associated with each field of the selected set of fields.

20. The system of claim 17, wherein the weight corresponds to a bit width of a respective field of the set of fields associated with the at least one of the respective frequencies.

* * * * *